US010036528B2

(12) United States Patent
Kawabata

(10) Patent No.: US 10,036,528 B2
(45) Date of Patent: Jul. 31, 2018

(54) VEHICLE COMBINATION LAMP

(71) Applicant: Stanley Electric Co., Ltd., Tokyo (JP)

(72) Inventor: Mari Kawabata, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 286 days.

(21) Appl. No.: 14/940,395

(22) Filed: Nov. 13, 2015

(65) Prior Publication Data

US 2016/0138773 A1  May 19, 2016

(30) Foreign Application Priority Data

Nov. 14, 2014  (JP) .................................. 2014-231169

(51) Int. Cl.
| | |
|---|---|
| *B60Q 1/02* | (2006.01) |
| *F21S 8/10* | (2006.01) |
| *F21S 43/239* | (2018.01) |
| *F21S 43/243* | (2018.01) |
| *F21S 43/245* | (2018.01) |
| *F21S 43/249* | (2018.01) |
| *F21S 43/251* | (2018.01) |
| *F21S 43/40* | (2018.01) |

(52) U.S. Cl.
CPC ............. *F21S 48/24* (2013.01); *F21S 43/239* (2018.01); *F21S 43/243* (2018.01); *F21S 43/245* (2018.01); *F21S 43/249* (2018.01); *F21S 43/251* (2018.01); *F21S 43/40* (2018.01)

(58) Field of Classification Search
CPC ............ F21W 2101/10; F21W 2101/12; F21S 48/1241; F21V 2200/13; F21V 2200/20; B60Q 1/0041; B60Q 1/2607
See application file for complete search history.

(56) References Cited

U.S. PATENT DOCUMENTS

| | | | | |
|---|---|---|---|---|
| 7,111,970 B2 * | 9/2006 | Gasquet | ............... | B60Q 1/2607 362/507 |
| 9,457,708 B2 * | 10/2016 | Noritake | ............... | B60Q 1/0041 |
| 2013/0265791 A1 * | 10/2013 | Dassanayake | ........ | F21S 48/215 362/520 |

(Continued)

FOREIGN PATENT DOCUMENTS

JP  2014-123547 A  7/2014

*Primary Examiner* — Ismael Negron
(74) *Attorney, Agent, or Firm* — Kenealy Vaidya LLP

(57) ABSTRACT

A vehicle lamp includes first and second lamp units separated by a gap, each having a housing and an outer lens defining a chamber, and a band-shaped light emission portion separated by the gap. The band-shaped light emission portion of the first lamp unit includes a light guiding body having an inclined end face, an incident end face proximate a light source, and a light guiding body between the inclined end face and the incident end face. A reflector, positioned behind the inclined end face, is configured to extend around and behind portions of the second housing and the second outer lens of the second lamp unit. Light from the light source is projected into the incident end face, conducted by the light guiding body to the inclined end face, and reflected by the inclined end face rearward towards the reflector which then reflects the light forward to illuminate the gap between the band-shaped light emission portions.

4 Claims, 4 Drawing Sheets

(56) References Cited

U.S. PATENT DOCUMENTS

| | | | |
|---|---|---|---|
| 2013/0314935 A1* | 11/2013 | Tokieda | G02B 6/0001 362/511 |
| 2014/0160777 A1* | 6/2014 | Mugge | F21S 48/00 362/508 |
| 2014/0254186 A1* | 9/2014 | Terai | G02B 6/0095 362/487 |
| 2016/0061397 A1* | 3/2016 | Ito | F21S 48/1163 362/520 |
| 2016/0103269 A1* | 4/2016 | Narita | G02B 6/002 362/617 |

* cited by examiner

VEHICLE COMBINATION LAMP

This application claims the priority benefit under 35 U.S.C. § 119 of Japanese Patent Application No. 2014-231169 filed on Nov. 14, 2014, which is hereby incorporated in its entirety by reference.

TECHNICAL FIELD

The presently disclosed subject matter relates to vehicle combination lamps, and in particular, a combination lamp for a vehicle including two lamp units to be adjacently installed in a vehicle body in a vehicle width direction.

BACKGROUND ART

In Japanese Patent Application Laid-Open No. 2014-123547, disclosed is a vehicle combination lamp in which two lamp units are combined together to provide an aesthetic feature as a unit and which is installed on a rear face of a vehicle body including a rear door across the side area of the rear face and the rear door. Specifically, one of the lamp units is provided to the side area of the rear face of the vehicle main body adjacent to the rear door while the other one is provided to the rear face of the rear door, so that they are adjacently disposed side by side in a vehicle width direction. The lamp units each have a band-shaped light emission portion utilizing a light guiding body. The band-shaped light emission portions extend in the width direction (in the left-right direction), so that they are configured to be observed as if the band-shaped light emission portion of the one lamp unit continues from the other band-shaped light emission portion of the other lamp unit.

In this configuration, however, there is a gap formed between the lamp units. In order to obscure the gap by light emission, the band-shaped light emission portions each have an end portion so that the end portion of the light guiding body of the band-shaped light emission portion of one lamp unit overlap the end portion of the light guiding body of the band-shaped light emission portion of the other lamp unit at the gap position. This configuration can improve a sense of unity of both the band-shaped light emission portions.

However, with this configuration, since the end portions of the light guiding bodies overlap each other at the position of the gap, light may be irregularly reflected or scattered at that area, thereby deteriorating the aesthetic feature and design. The irregular reflection and scattering at that portion can hinder the intended way of illumination, resulting in unfavorable light distribution characteristics.

SUMMARY

The presently disclosed subject matter was devised in view of these and other problems and features in association with the conventional art. According to an aspect of the presently disclosed subject matter, a vehicle combination lamp can include two lamp units each having a band-shaped light emission portion and can prevent (or suppress) the gap between the band-shaped light emission portions from being observed as if they are separated away from each other even when end portions of light guiding bodies of the band-shaped light emission portions of the two lamp units do not overlap each other in the front-rear direction.

According to another aspect of the presently disclosed subject matter, a vehicle combination lamp can include: a first lamp unit and a second lamp unit which can be adjacently installed in a vehicle body in a vehicle width direction. The first lamp unit can include: a first housing having an opening at its front side; a first translucent outer lens configured to be attached to the first housing so as to cover the opening of the first housing, the first housing and the first outer lens configured to define a first lighting chamber; a light guiding body configured to extend in the vehicle width direction within the first lighting chamber and having a first end face and a second end face closer to the second lamp unit; a light source disposed to face to the first end face of the light guiding member at a side opposite to a side closer to the second lamp unit; and a reflector configured to be disposed behind the second end face of the light guiding body. The light guiding body can be configured to guide light emitted from the light source and incident on the first end face thereof toward the second end face thereof so that the guided light can be allowed to exit the light guiding body through its front face forward. The second end face of the light guiding body can be configured to be inclined with respect to the front face of the light guiding body so as to form an obtuse angle with the front face, so that the light guided by the light guiding body can be reflected by the second end face rearward. The reflector can be configured to reflect the light, which is reflected by the second end face and exit the light guiding body through its rear face, forward. The second lamp unit can include: a second housing having an opening at its front side; a second translucent outer lens configured to be attached to the second housing so as to cover the opening of the second housing, the second housing and the second outer lens configured to define a second lighting chamber; and a band-shaped light emission portion configured to extend in the vehicle width direction within the second lighting chamber and project light forward. The first outer lens can have a portion closer to the second lamp unit that is disposed behind portions of the second housing and the second outer lens closer to the first lamp unit. The reflector can be configured to go around and behind the portions of the second housing and the second outer lens closer to the first lamp unit.

According to another aspect of the presently disclosed subject matter, the vehicle combination lamp according to the previous aspect can be configured such that the first lamp unit can further include an optical element portion configured to be disposed before the reflector and behind the first outer lens and diffuse the light reflected by the reflector. In this configuration, the optical element portion can include side wall portions and an interstage portion configured to connect the side wall portions to be formed in a step-like shape as a whole. Furthermore, in this configuration, the first outer lens can have a step-like shape corresponding to the shape of the optical element portion, the step-like first outer lens and optical element portion can be disposed before the reflector and behind the portion of the second lamp unit closer to the first lamp unit.

With the aforementioned configuration, the reflector configured to go around and behind the portions of the second housing and the first outer lens closer to the first lamp unit can reflect the light, which has been reflected by the second end face of the light guiding body and exited through the rear face of the light guiding body, forward. Thus, when the light source is lit as well as the band-shaped light emission portion projects light, the area between the end portion of the band-shaped light emission portion and the second end face of the light guiding body can be illuminated with light when observed from outside. Therefore, the end portion of the band-shaped light emission portion closer to the first lamp unit and the end portion of the light guiding body closer to the second lamp unit are not required to overlap each other in the front-rear direction.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A description will now be made below to vehicle combination lamps of the presently disclosed subject matter with reference to the accompanying drawings in accordance with exemplary embodiments. It should be noted that the following exemplary embodiments include various limitations for implementing the presently disclosed subject matter, which are not limitative. Furthermore, in the specification and the drawings, the directions are basically defined on the basis of the light projection direction of the vehicle combination lamp unless otherwise specified (in some descriptions, the posture of the vehicle combination lamp installed on a rear side of a vehicle body is used to define the directions).

Figure 1:
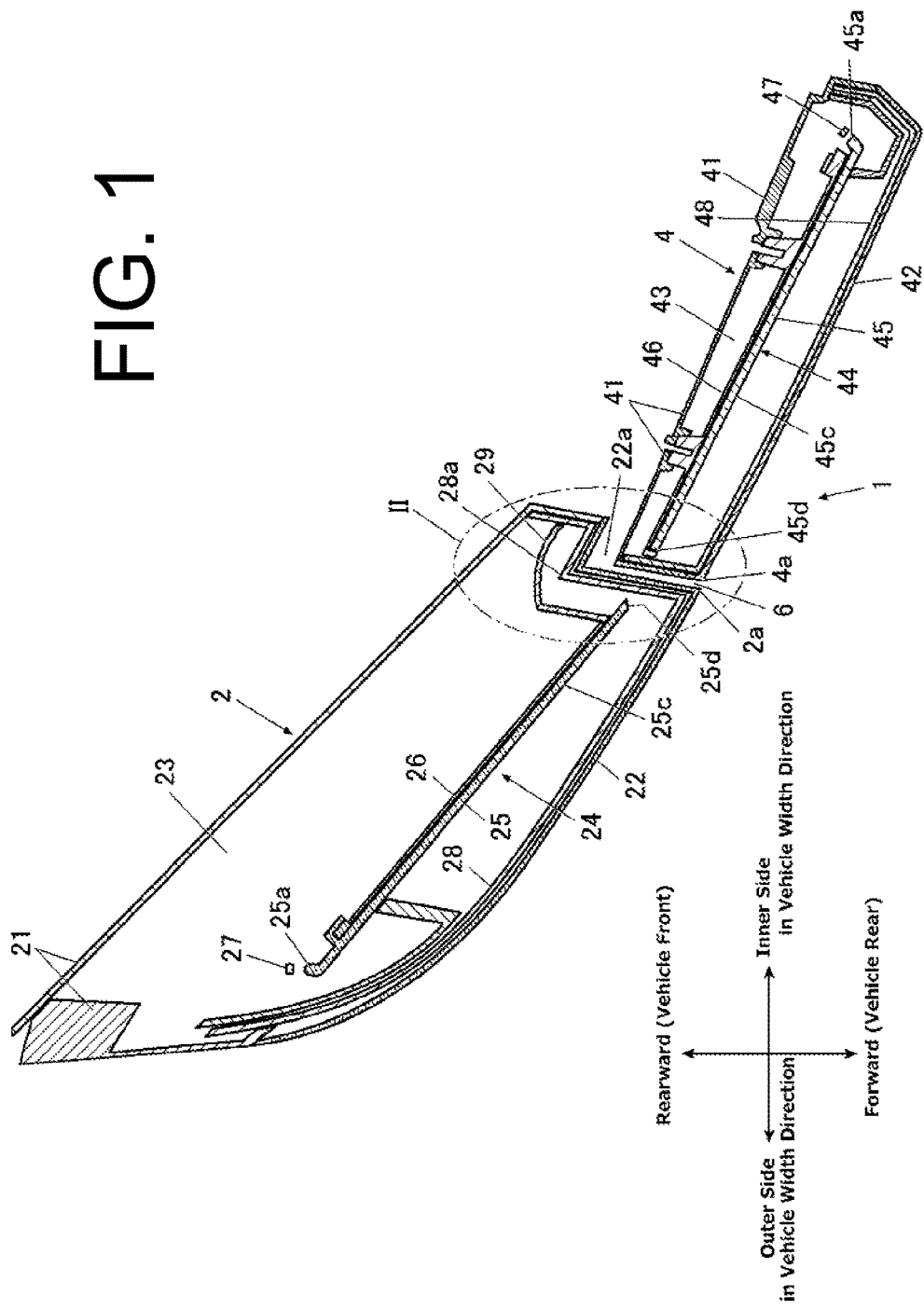
FIG. 1 is a horizontal cross-sectional view of a vehicle combination lamp made in accordance with principles of the presently disclosed subject matter.
Figure 2:
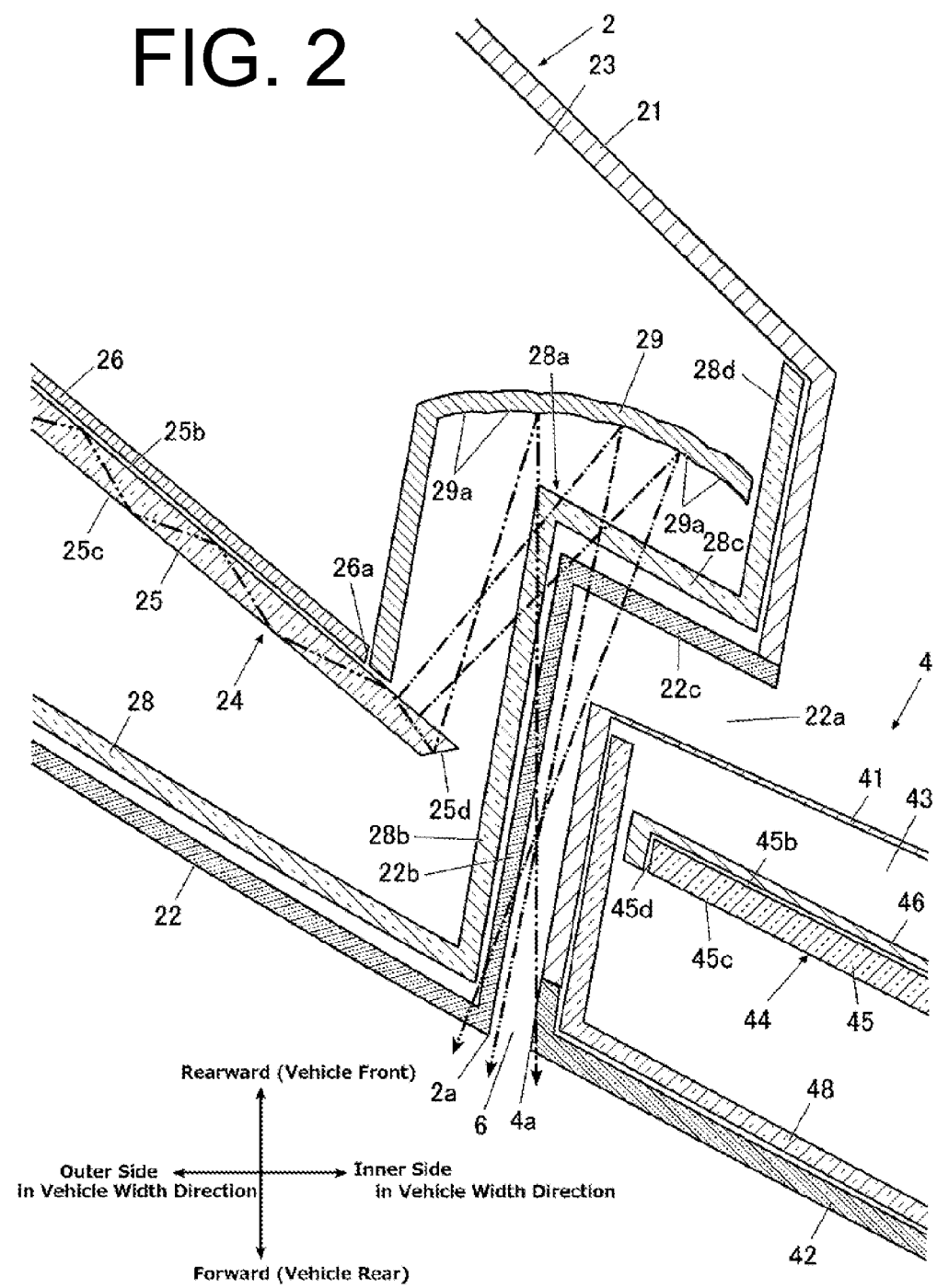
FIG. 2 is an enlarged view of a part II of FIG. 1.

FIG. 1 is a horizontal cross-sectional view of a vehicle combination lamp 1 to be installed in a rear portion of a vehicle body, and FIG. 2 is an enlarged view of a part II of FIG. 1.

This vehicle combination lamp 1 illustrated in FIG. 1 can be used as a left rear lamp to be installed in a left rear portion of a vehicle main body and have a symmetric shape to that for use as a right rear lamp. Thus, the left rear vehicle combination lamp 1 can be a mirror image of the right rear vehicle combination lamp.

The vehicle combination lamp 1 can have a first lamp unit 2 and a second lamp unit 4 in combination so that the two lamp units 2 and 4 can form a united design.

Specifically, the vehicle main body configured to include the vehicle combination lamp can include a rear opening (such as an opening of a trunk, an opening of a rear door, etc.) and an opening/closing member to close the opening (such as a rear door, a trunk lid, etc.). The first lamp unit 2 can be provided to the side area of the rear portion (rear face) of the vehicle main body. The second lamp unit 4 can be provided to a rear face of the opening/closing member at its edge area in the vehicle width direction. With this configuration, when the opening/closing member is closed, the second lamp unit 4 can be disposed inside of the first lamp unit 2 in the vehicle width direction, so that the first lamp unit 2 and the second lamp unit 4 can be adjacently disposed side by side. At this time, the portion of the first lamp unit 2 at its inner side in the vehicle width direction can be disposed behind the portion of the second lamp unit 4 at its outer side in the vehicle width direction to be concealed thereby (when the entire vehicle is considered as the basis for the direction, the disposed position of the portion of the first lamp unit 2 is on the front side). Therefore, when the vehicle main body is observed from its rear side (namely the front face of the vehicle combination lamp is observed), there is a gap 6 between an end 2a of the first lamp unit 2 on the inner side in the vehicle width direction and an end 4a of the second lamp unit 4 on the outer side in the vehicle width direction. When the first lamp unit 2 is turned on, however, the gap 6 can be illuminated with light. The "front side" illustrated in FIGS. 1 and 2 is the front side of the vehicle combination lamp 1, not the front side of the vehicle main body, and thus, the light emission from the vehicle combination lamp 1 is the "forward" direction in this case. As indicated, the "front" means the rearward direction of the vehicle body while the "rear" means the forward direction of the vehicle body in FIGS. 1 and 2.

The first lamp unit 2 can include a housing 21 and an outer lens 22 configured by a translucent outer cover that can transmit light. The housing 21 can be configured to have a hollow box shape with an opening at its front face. The outer lens 22 can be attached to the front edge of the opening of the housing 21 so as to close the opening of the housing 21. This configuration can define a lighting chamber 23 surrounded by the housing 21 and the outer lens 22.

The second lamp unit 4 can have a similar configuration, i.e., can include a housing 41 and an outer lens 42 configured by a translucent outer cover that can transmit light, so that a lighting chamber 43 can be defined by the housing 41 and the outer lens 42.

The outer lens 22 of the first lamp unit 2 can have a stepped recessed portion 22a formed in its front face at its inner end portion in the vehicle width direction. Specifically, the front face of the outer lens 22 at the end portion on the inner side in the vehicle width direction can be recessed rearward and toward the inner side and side face thereof can be recessed outward in the vehicle width direction, to thereby form the stepped recessed portion 22a. The thus formed recessed portion 22a can be opened forward and inward in the vehicle width direction.

The recessed portion 22a can be configured to include a thin-walled flange portion 22c disposed on its rear side and a side wall portion 22b combined to form a letter "L" shape as illustrated in FIG. 2.

When the first lamp unit 2 is installed in the vehicle main body, the outer lens 22 of the first lamp unit 2 directed forward and outward in the vehicle width direction can follow the shape of the surface of the vehicle main body to flush with the surface of the vehicle main body. Furthermore, when the second lamp unit 4 is installed in the opening/closing member, the outer lens 42 of the second lamp unit 4 directed forward can follow the shape of the surface of the opening/closing member to flush with the surface of the opening/closing member. Further, when the opening/closing member is closed, the portions of the housing 41 and the outer lens 42 of the second lamp unit 4 on the outer side in the vehicle width direction can be disposed within the recessed portion 22a of the first lamp unit 2, so that the flange portion 22c of the outer lens 22 of the first lamp unit 2 can be disposed behind the portions of the housing 41 and the outer lens 42 of the second lamp unit 4 on the outer side in the vehicle width direction. With this configuration, there is no step formed between the front faces of the outer lenses 22 and 42, so that the first lamp unit 2 and the second lamp unit 4 in combination can be configured to form a united design. The portions of the housing 41 and the outer lens 42 of the second lamp unit 4 on the outer side in the vehicle width direction can overlap the portion of the outer lens 22 of the first lamp unit 2 on the inner side in the vehicle width direction. Even in this configuration, those portions do not hinder the opening and closing of the opening/closing member.

Furthermore, in this configuration, there can be formed the gap 6 between the side wall portion 22*b* of the outer lens 22 of the first lamp unit 2 and the end faces of the housing 41 and the outer lens 42 of the second lamp unit 4 on the outer side in the vehicle width direction.

The second lamp unit 4 can include a band-shaped light emission portion 44 to be disposed within the lighting chamber 43. The band-shaped light emission portion 44 can be directed forward to project light forward. The band-shaped light emission portion 44 can be horizontally wide to extend in the vehicle width direction to the end portion within the lighting chamber 43 on the outer side in the vehicle width direction.

The band-shaped light emission portion 44 can include a light guiding body 45, a reflection plate 46, and a light source 47. The light guiding body 45 can be in a band-plate like shape to extend in the vehicle width direction. The light guiding body 45 can have an end face 45*a* on the inner side in the vehicle width direction, where the light source 47 can be disposed to face thereto. The light source 47 can utilize a light-emitting diode, for example. Or alternatively, the light source 47 may be a bulb.

When the light source 47 is turned on, the light emitted from the light source 47 can be incident on the end face 45*a* of the light guiding body 45 to enter the light guiding body 45. The light having entered the light guiding body 45 can be repeatedly reflected within the light guiding body 45 by its rear face 45*b* and front face 45*c* so as to be guided toward the end face 45*d* on the opposite side. The rear face 45*b* of the light guiding body 45 can function as a light controlling face. This function can be imparted by forming a plurality of diffusion/reflection portions in the rear face 45*b*. The diffusion/reflection portions can take a shape of a lens cut, a prism cut, a dot, a protrusion with a triangle sectional shape, etc. The light propagating through the light guiding body 45 can be diffused and reflected forward by the rear face 45*b* of the light guiding body 45 having the plurality of diffusion/reflection portions. Then, part of the reflected light can be incident on the front face 45*c* at an angle of incidence smaller than the critical angle. That part of the light can pass through the front face 45*c* to be projected forward (rearward when considering the vehicle body as a basis for the direction). Since the reflection plate 46 is disposed to face the rear face 45*b* of the light guiding body 45, the light leaked through the rear face 45*b* of the light guiding body 45 can be reflected forward (rearward with respect to the vehicle body) and the reflected light can pass through the light guiding body 45 forward.

The band-shaped light emission portion 44 may be configured to include a member other than the light guiding body 45. For example, a plurality of point light sources (for example, light emitting diodes) arranged in the vehicle width direction can be utilized as the band-shaped light emission portion 44. Alternatively, a surface light source, such as an organic EL element, can be formed to extend in the vehicle width direction to be utilized as the band-shaped light emission portion 44.

An inner lens (or inner cover) 48 can be disposed to follow the inner surface of the outer lens 42 in front of the light guiding body 45 in the lighting chamber 43. The inner lens 48 can be formed from a plain transparent plate so that the light exiting through the front face 45*c* of the light guiding body 45 is allowed to pass through the inner lens 48. The inner lens 48 may be colored or not colored. The inner lens 48 may have an optical function imparted by its surface shape to deflect or diffuse the light exiting through the front face 45*c* of the light guiding body 45.

The first lamp unit 2 can include a band-shaped light emission portion 24 to be disposed within the lighting chamber 23. The band-shaped light emission portion 24 can include a light guiding body 25, a reflection plate 26, and a light source 27.

The light guiding body 25 can be in a band-plate like shape to extend in the vehicle width direction to a position closer to the side wall 22*b* of the lighting chamber 23. The light guiding body 25 can have an end face 25*a* on the outer side in the vehicle width direction, where the light source 27 can be disposed to face thereto. The light source 27 can utilize a light-emitting diode, for example. The end face 25*a* of the light guiding body 25 on the outer side in the vehicle width direction can serve as a light incident face. When the light source 27 is turned on, the light emitted from the light source 27 can be incident on the end face 25*a* of the light guiding body 25 to enter the light guiding body 25.

The light guiding body 25 can have a rear face 25*b* and a front face 25*c* both serving as a reflection surface. The light having entered the light guiding body 25 can be repeatedly reflected within the light guiding body 25 by its rear face 25*b* and front face 25*c* so as to be guided toward an end face 25*d* thereof on the opposite side.

Here, the rear face 25*b* of the light guiding body 25 can also function as a light controlling face while the front face 25*c* thereof can also function as a light exiting face. This function of the rear face 25*b* can be imparted by forming a plurality of diffusion/reflection portions in the rear face 25*b*. The diffusion/reflection portions can take a shape of a lens cut, a prism cut, a dot, a protrusion with a triangle sectional shape, etc. The light propagating through the light guiding body 25 can be diffused and reflected forward by the rear face 25*b* of the light guiding body 25 having the plurality of diffusion/reflection portions. Then, part of the reflected light can be incident on the front face 25*c* at an angle of incidence smaller than the critical angle. That part of the light can pass through the front face 25*c* to be projected forward.

Since the reflection plate 26 is disposed to face the rear face 25*b* of the light guiding body 25, the light leaked through the rear face 25*b* of the light guiding body 25 can be reflected forward (rearward with respect to the vehicle body) and the reflected light can pass through the light guiding body 25 forward.

An inner lens (or inner cover) 28 can be disposed to follow the inner surface of the outer lens 22 in front of the light guiding body 25 in the lighting chamber 23. The inner lens 28 can be formed from a plain transparent plate so that the light exiting through the front face 25*c* of the light guiding body 25 is allowed to pass through the inner lens 28. The inner lens 28 may be colored or not colored. The inner lens 28 may have an optical function imparted by its surface shape to deflect or diffuse the light exiting through the front face 25*c* of the light guiding body 25.

The end face 25*d* of the light guiding body 25 on the inner side in the vehicle width direction can be configured to be inclined with respect to the front face 25*c* of the light guiding body 25 so that the angle formed by the end face 25*d* and the front face 25*c* in a horizontal cross section can become an obtuse angle while the angle formed by the end face 25*d* and the rear face 25*b* in the horizontal cross section can become an acute angle. Therefore, the end face 25*d* of the light guiding body 25 can be configured such that the light guided to the end face 25*d* of the light guiding body 25 can be reflected by the same rearward to be incident on the rear face 25*b* of the light guiding body 25 at an angle of incidence smaller than the critical angle. As a result, the reflected light can pass through the rear face 25*b* rearward.

The reflection plate 26 behind the light guiding body 25 can extend in the vehicle width direction but end before the end face 25*d* of the light guiding body 25, meaning that the light guiding body 25 can extend further from an edge 26*a* of the reflection plate 26 on the inner side in the vehicle width direction. Therefore, there is no reflection plate 26 behind the light guiding body 25 at the position of the end face 25*d*. With this configuration, when the light reflected by the end face 25*d* of the light guiding body 25 can exit through the rear face 25*b* thereof, the light can pass by the edge 26*a* of the reflection plate 26 on the inner side in the vehicle width direction rearward. Furthermore, some part of light propagating through the light guiding body 25 can be leaked through the rear face 25*b* of the light guiding body 25 projected from the edge 26*a* of the reflection plate 26 and can pass by the edge 26*a* of the reflection plate 26 on the inner side in the vehicle width direction rearward.

The first lighting unit 2 can further include a reflector 29 to be disposed behind the end face 25*d* of the light guiding body 25. In particular, the reflector 29 can be configured to go around and behind the flange portion 22*c* of the outer lens 22 in the lighting chamber 23. Herein, the reflector 29 can also go around and behind the portions of the housing 41 and the outer lens 42 on the outer side in the vehicle width direction. Furthermore, the reflector 29 can also go around and behind the portion of the light guiding body 45 on the outer side in the vehicle width direction.

The reflector 29 can have a front face serving as a reflection surface, and be configured basically by a concave surface, such as a paraboloidal surface. The front face can be composed of a plurality of small reflection faces 29. The reflector 29 can be configured to reflect the light that is reflected by the end face 25*d* of the light guiding body 25 and passes through the rear face 25*b* and passes by the edge 26*a* of the reflection plate 26 and the light that passes through the rear face 25*b* projected from the edge 26*a* of the reflection plate 26 and passes by the edge 26*a*, forward to diffuse the reflected light in the vehicle width direction.

The inner lens 28 can include an optical element portion 28*a* in front of the reflector 29. The optical element portion 28*a* can be formed in a step-like shape along the side wall portion 22*b* and the flange portion 22*c* of the outer lens 22 and the side face of the housing 21 on the inner side in the vehicle width direction. Specifically, the optical element portion 28*a* can include thin-plate side wall portions 28*b* and 28*d* in the shape including two steps, and a thin-plate interstage portion 28*c* connecting these side wall portions 28*b* and 28*d*. The side wall portion 28*b* can continue on from the end of the inter lens 28 on the inner side in the vehicle width direction, then the interstage portion 28*c* can extend from the rear end of the side wall portion 28*b* inward in the vehicle width direction, and the side wall portion 28*d* can extend rearward from the inner end of the interstage portion 28*c* in the vehicle width direction. Accordingly, in the lighting chamber 23, the side wall portion 28*b* can face to the side wall portion 22*b* of the outer lens 22, the interstage portion 28*c* can face to the flange portion 22*c*, and the side wall portion 28*d* can face to the side face of the housing 21.

In this exemplary embodiment, a shape having a light diffusion function, such as flute cuts, can be provided to the inner faces of the side wall portions 28*b* and 28*d* and the interstage portion 28*c*. Herein, the flute cuts can be a plurality of cylindrical convex shapes arranged side by side. Specifically, a plurality of half-cylindrical shapes can be formed side by side on the inner faces of the side wall portions 28*b* and 28*d* and the interstage portion 28*c* and extend in the horizontal direction (a direction parallel with the plane of paper of FIG. 2), so that the cylindrical convex shapes can be arranged in the vertical direction (a direction perpendicular to the plane of paper of FIG. 2). Therefore, when the light reflected by the reflector 29 passes through the side wall portions 28*b* and 28*d* and the interstage portion 28*c*, the light can be diffused upward and downward by the optical action of the flute cuts formed in the side wall portions 28*b* and 28*d* and the interstage portion 28*c*.

In this configuration, the end face 25*d* of the light guiding body 25 and the end face 45*d* of the light guiding body 45 can be separated away from each other in the vehicle width direction, and thus, the end portion of the light guiding body 25 on the inner side in the vehicle width direction does not overlap the end portion of the light guiding body 45 on the inner side in the vehicle width direction. Thus, there is a gap between them.

However, since the light reflected by the reflector 29 forward can conceal the gap (including the gap 6) between the end face 25*d* of the light guiding body 25 and the end face 45*d* of the light guiding body 45 when the vehicle combination lamp 1 is observed from its front side. This means that that gap portion cannot be darkened even when the light guiding bodies are not overlapped with each other unlike the conventional lamp structure. With this configuration, when the light sources 27 and 47 are turned on, the entire length of the light guiding bodies 25 and 45 from the light incident face 25*a* of the light guiding body 25 to the light incident face 45*a* of the light guiding body 45 can be illuminated with light as a single unit (namely, the light can be observed as if the light can be emitted from the entire length). Accordingly, even when the end face 25*d* of the light guiding body 25 and the end face 45*d* of the light guiding body 45 are separated away from each other in the vehicle width direction, the light can be diffused and emitted through the gap therebetween, whereby one can observe that area emitting light.

When the vehicle combination lamp 1 is observed from its front side, the reflector 29 reflecting light may be observed through the side wall portions 28*b* and 28*d* and the interstage portion 28*c*. However, the outer surfaces of the side wall portions 28*b* and 28*d* and the interstage portion 28*c* can be subjected to a light scattering processing, such as a surface texturing, and thereby the light reflected by the reflector 29 and passing through the side wall portions 28*b* and 28*d* and the interstage portion 28*c* can be scattered. Therefore, when the vehicle combination lamp 1 is observed from its front side, the observed state of the reflector 29 when it reflects light can become close to the observed state of the front faces 25*c* and 45*c* of the light guiding bodies 25 and 45 when they emit light, thereby reducing the difference in the observed state of light emission due to the different optical parts.

It should be noted that examples of the function presenting signal signs indicated by the first and second lamp units 2 and 4 when they emit light may include a rear lamp, a brake lamp, a reverse lamp, a direction indicator lamp, and a warning lamp.

Modified Example 1

Figure 3:
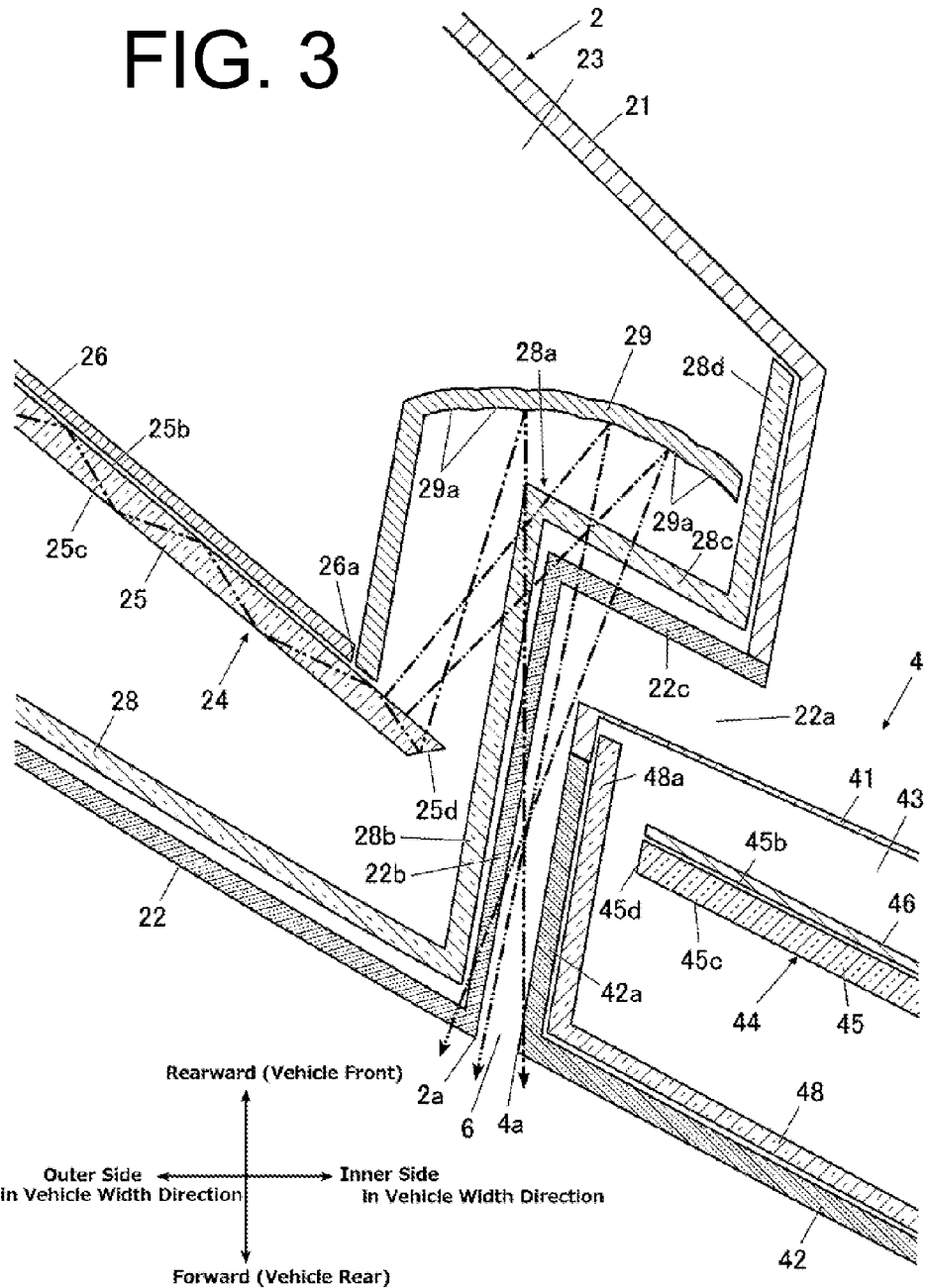
FIG. 3 is an enlarged view of a modified example corresponding to FIG. 2.

FIG. 3 is an enlarged view of a modified example corresponding to FIG. 2, in which the end face 45*d* of the light guiding body 45 on the outer side in the vehicle width direction is not covered with the reflection plate 46 and is exposed. Furthermore, the side portion of the housing 41 on the outer side in the vehicle width direction can be shortened as compared with the case of FIG. 2, and accordingly, a side face portion 42a of the outer lens 42 on the outer side in the vehicle width direction can be configured to extend to the position behind the end face 45d (up to the retracted side portion of the housing 41). As a result, the side face portions 42a and 48a of the outer lens 42 and the inner lens 48 can be disposed in between the end face 45d of the light guiding body 45 and the end face 25d of the light guiding body 25. Also, the side wall portions 22b and 28b of the first lamp unit 2 can be disposed in between the end face 45d of the light guiding body 45 and the end face 25d of the light guiding body 25.

With this configuration of Modified Example 1, the light exiting through the end face 45d of the light guiding body 45 can pass through the side face portions 42a and 48a and further through the side wall portions 22b and 28b. On the other hand, the light exiting through the end face 25d of the light guiding body 25 can pass through the side wall portions 22b and 28b and further through the side face portions 42a and 48a. When passing this area, the light can be diffused/scattered by the optical element portion 28a provided to the inner lens 28 as described above. As a result, when the vehicle combination lamp 1 is observed from its front side, the gap 6 cannot be darkened but can be irradiated with light, and accordingly, the entire length of the band-shaped light emission portions 24 and 44 of the first and second lamp units 2 and 4 can be illuminated with light as a single unit (namely, the light can be observed as if the light can be emitted from the entire length). It should be noted that the side face portions 48a and 42a and the side wall portion 22b can be provided with an optical element portion like the optical element portion 28a to impart the diffusion/scattering effect to those portions. This configuration can enhance the concealing effect of the darkened gap 6.

Modified Example 2

The reflector 29 may be configured to reflect and diffuse light not only in the vehicle width direction but also in the vertical direction (up-down direction). In this case, the inner faces of the side wall portions 28b and 28d and the interstage portion 28c may be smoothened without any lens cuts or the like optical functional portions formed therein. In this case, the reflector 29 can effectively reflect and diffuse the light in all directions, resulting in the increased efficiency of illumination of the gap 6 and area therearound. Furthermore, there is no need to process the inner lens 28 for lens cuts and the like, resulting in cost cut.

Modified Example 3

The reflector 29 may be configured to reflect and diffuse light only in the vertical direction. In this case, a plurality of half-cylindrical shapes (flute cuts) may be formed side by side on the inner faces of the side wall portions 28b and 28d and the interstage portion 28c and extend in the vertical direction (a direction perpendicular to the plane of paper of FIG. 2), so that the cylindrical convex shapes can be arranged in the horizontal direction (a direction parallel with the plane of paper of FIG. 2). Therefore, when the light reflected and vertically diffused by the reflector 29 passes through the side wall portions 28b and 28d and the interstage portion 28c, the light can be diffused in the horizontal direction by the optical action of the flute cuts formed in the side wall portions 28b and 28d and the interstage portion 28c. In this case, the reflector 29 and the inner lens 28 can effectively and cooperatively reflect and diffuse the light in all directions, resulting in the increased efficiency of illumination of the gap 6 and area therearound. Furthermore, the optical processing performed on the reflector 29 and the inner lens 28 can be simple unidirectional process, resulting in cost cut.

Modified Example 4

The vehicle combination lamp 1 may be configured such that the inner surfaces of the side wall portions 28b and 28d and the interstage portion 28c can be smoothened without any lens cuts, and the outer surfaces of the side wall portions 28b and 28d and the interstage portion 28c may be subjected to a light scattering processing, such as a surface texturing. Or alternatively, the vehicle combination lamp 1 may be configured such that the outer surfaces of the side wall portions 28b and 28d and the interstage portion 28c may be smoothened without any scattering process, and the inner surfaces of the side wall portions 28b and 28d and the interstage portion 28c may be provided with lens cuts formed therein. In this case, the surface to be processed can be selected according to the intended specification, resulting in increased variation of designs. Furthermore, the degree of freedom in design can be improved.

Modified Example 5

In this Modified Example, the side wall portions 28b and 28d and the interstage portion 28c can pass light therethrough without any optical action. Specifically, the vehicle combination lamp 1 may be configured such that the inner surfaces of the side wall portions 28b and 28d and the interstage portion 28c may be smoothened without any lens cuts, and the outer surfaces of the side wall portions 28b and 28d and the interstage portion 28c may be smoothened without any scattering process (surface texturing). In this case, there is no need to process the inner lens 28 for lens cuts and the like, resulting in cost cut.

Modified Example 6

Figure 4:
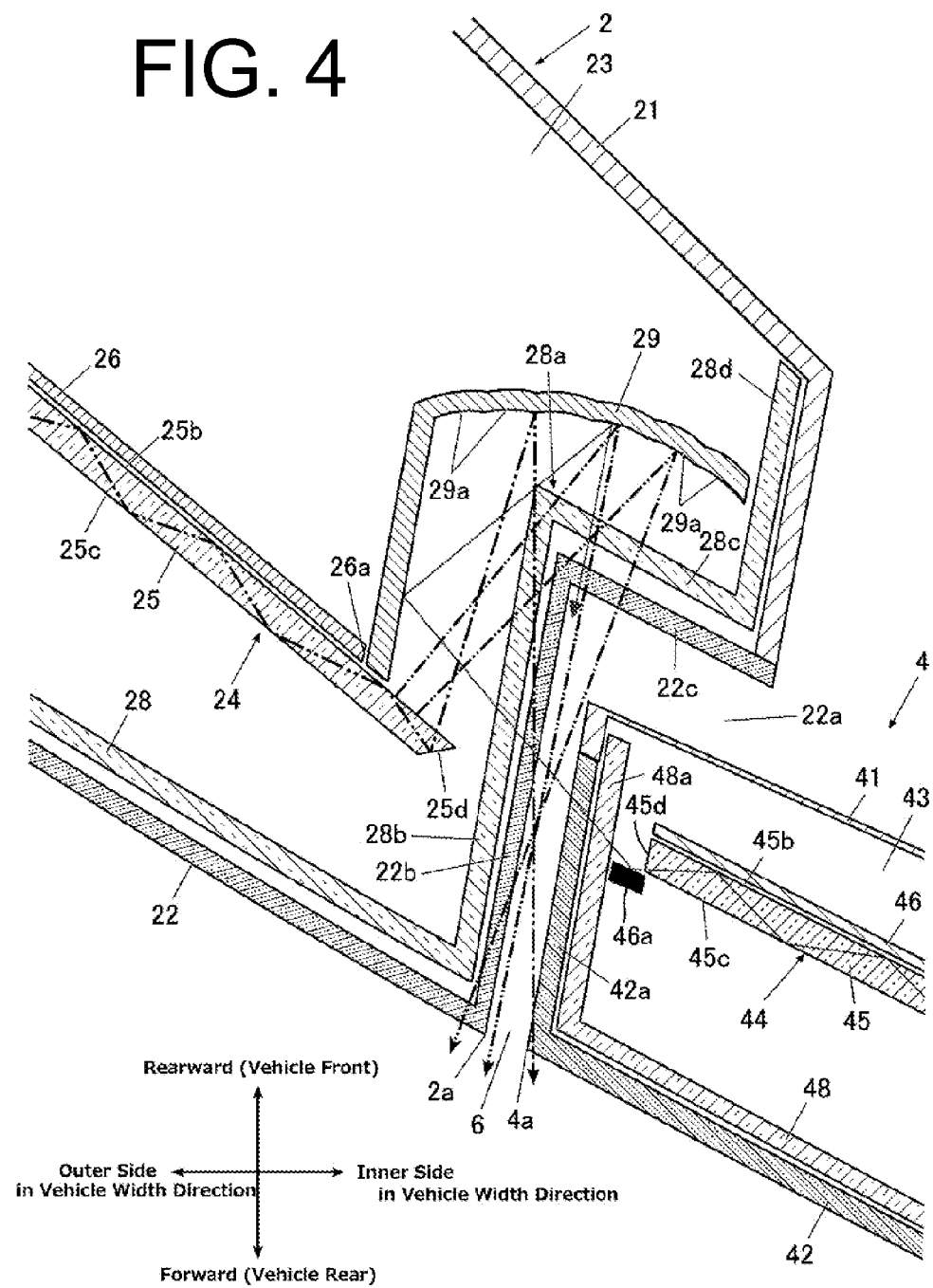
FIG. 4 is an enlarged view of another modified example corresponding to FIG. 2.

The vehicle combination lamp 1 may be configured to further include a reflective optical system such as a reflector 46a in front of the end portion of the band-shaped light emission portion 44 on the outer side in the vehicle width direction. In this case, the reflector 46a of the reflective optical system can reflect light exiting through the end portion of the band-shaped light emission portion 44 on the outer side in the vehicle width direction toward the reflector 29, and then the reflector 29 can reflect and diffuse the light (solid line from the reflector 46a in FIG. 4) in the manner as described above. Accordingly, the light utilization efficiency can be enhanced by that amount.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle combination lamp comprising:
a first lamp unit and a second lamp unit which are adjacently installed in a vehicle body in a vehicle width direction,
the first lamp unit comprising:
   a first housing having an opening at its front side;
   a first translucent outer lens attached to the first housing so as to cover the opening of the first housing, the first housing and the first outer lens configured to define a first lighting chamber;
   a light guiding body extending in the vehicle width direction within the first lighting chamber and having a first end face and a second end face closer to the second lamp unit;
   a light source disposed to face to the first end face of the light guiding member at a side opposite to a side closer to the second lamp unit; and
   a reflector disposed behind the second end face of the light guiding body, wherein
the light guiding body guides light emitted from the light source and incident on the first end face thereof toward the second end face thereof so that at least a first portion of the guided light exits the light guiding body through its front face forward,
the second end face of the light guiding body is inclined with respect to the front face of the light guiding body so as to form an obtuse angle with the front face, so that at least a second portion of the light guided by the light guiding body is reflected by the second end face rearward,
the reflector is configured to reflect the second portion of light forward;
the second lamp unit comprising:
   a second housing having an opening at its front side;
   a second translucent outer lens configured to be attached to the second housing so as to cover the opening of the second housing, the second housing and the second outer lens configured to define a second lighting chamber; and
   a band-shaped light emission portion configured to extend in the vehicle width direction within the second lighting chamber and project light forward, wherein
the first outer lens has a portion, closer to the second lamp unit, that is disposed behind portions of the second housing and the second outer lens closer to the first lamp unit, and
the reflector is configured to go around and behind the portions of the second housing and the second outer lens closer to the first lamp unit.

2. The vehicle combination lamp according to claim 1, wherein the first lamp unit further includes an optical element portion disposed before the reflector and behind the first outer lens and configured to diffuse the light reflected by the reflector.

3. The vehicle combination lamp according to claim 2, wherein the optical element portion has side wall portions and an interstage portion connecting the side wall portions to be formed in a step-like shape as a whole.

4. The vehicle combination lamp according to claim 3, wherein the first outer lens has a step-like shape corresponding to the shape of the optical element portion, the step-like first outer lens and optical element portion are disposed before the reflector and behind the portion of the second lamp unit closer to the first lamp unit.

* * * * *